April 15, 1924.
W. H. APPLEBY
STEAM HOT PLATE
Filed June 25, 1921
1,490,721
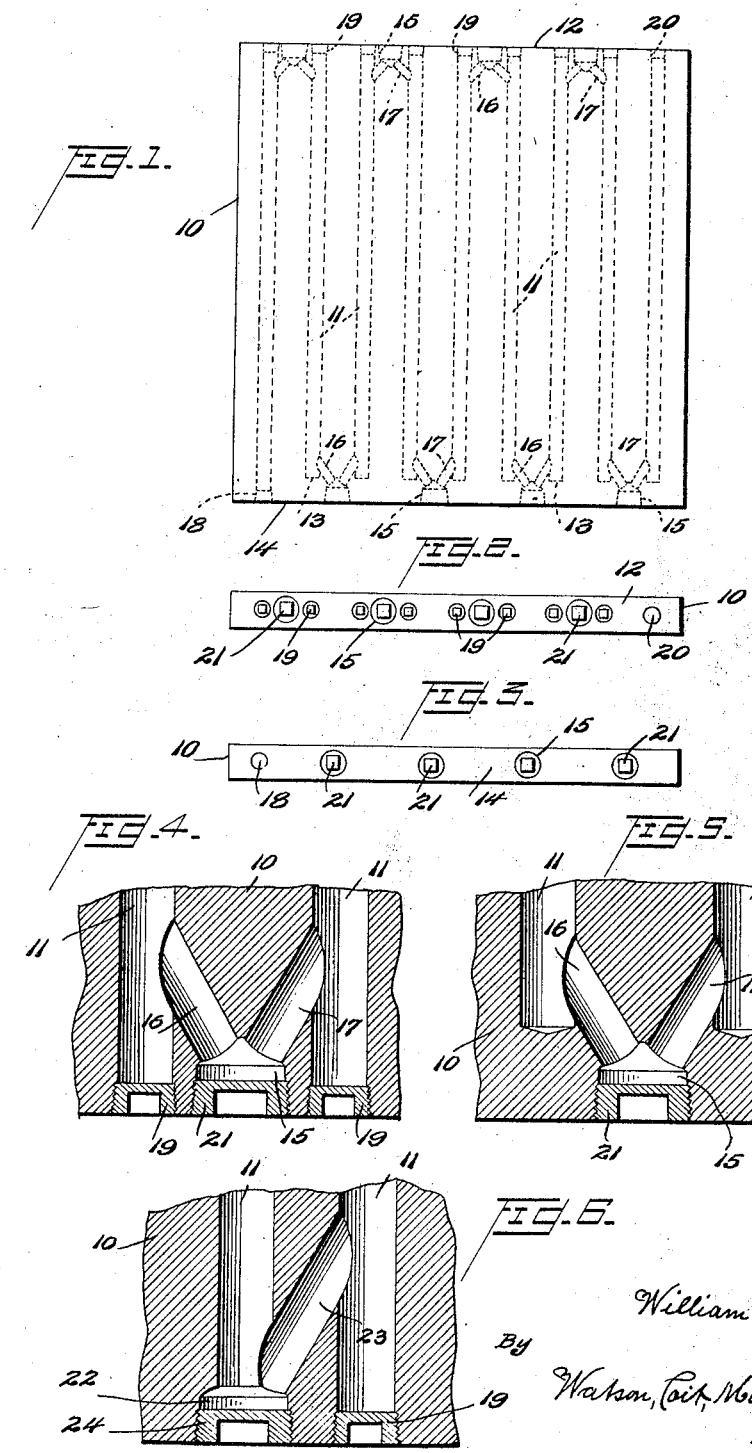

Patented Apr. 15, 1924.

1,490,721

UNITED STATES PATENT OFFICE.

WILLIAM H. APPLEBY, OF BALTIMORE, MARYLAND, ASSIGNOR TO BETHLEHEM STEEL COMPANY, OF BETHLEHEM, PENNSYLVANIA, A CORPORATION OF PENNSYLVANIA.

STEAM HOT PLATE.

Application filed June 25, 1921. Serial No. 480,427.

*To all whom it may concern:*

Be it known that I, WILLIAM H. APPLEBY, a citizen of the United States, residing at Baltimore, State of Maryland, have invented certain new and useful Improvements in Steam Hot Plates, of which the following is a specification.

This invention relates to plates used in presses acting on plastic material which requires heating or cooling during the operation. It embodies a novel plate structure having advantages over those ordinarily used and a novel method of forming it. It is well known that in the manufacture of celluloid sheets, rubber blankets and analogous articles of plastic material, the material is pressed between plates and for convenience and economy in operation the presses used usually embody a series of parallel plates which are simultaneously pressed together with layers of the material between them. The capacity of a press therefore depends largely upon the thickness of the plates used, and difficulty has been encountered in making them of the desired thinness on account of the necessity for providing circulating means in them for a heating fluid such as steam or a cooling fluid such as water. Plates made of cast iron with integral ducts for the circulating fluid are necessarily made rather thick. According to the present invention, forged and preferably rolled steel plates are used and they are not only stronger but their structure and method of formation are such that they may be much thinner than cast iron plates while furnishing efficiently the necessary means for heating and cooling. They furthermore avoid the objectionable feature of leaking joints due to contraction and expansion due to varying temperatures encountered in prior efforts to make successful steam plates. The novel features of the invention will be understood from the following description and claims taken with the drawings.

In the drawings:

Figure 1 is a plan view of the plate with the fluid passageway shown in dotted lines;

Figure 2 is an edge view of the plate on the margin from which the fluid ducts are drilled;

Figure 3 is an edge view from the opposite margin;

Figure 4 is an enlarged section through the entering ends of two adjacent ducts and connecting passageway;

Figure 5 is a similar view at the other ends of the ducts showing the intermediate socket and connecting passageways and Figure 6 is a view similar to Fig. 4, but showing a modified form of connection between adjacent tubes.

In making the embodiment of the invention shown, a steel plate 10 is formed by rolling and is rectangular in outline and of a uniform thickness sufficient to have therein a passageway of the desired size for fluid. To provide for circulating fluid through it a series of similar cylindrical parallel ducts 11 are then drilled in the plate from and at right angles to one margin marked 12 in Fig. 1, and terminating in closed ends 13 within the plate near the opposite margin 14. These ducts are of such size in cross section as compared to the thickness of the plate as will leave a sufficient thickness of metal at that line to properly distribute and conduct heat from or to them. These separate ducts must be connected together at alternate ends in series to form a continuous passageway for the circulation. In the form shown in Figures 1 to 5 they are connected by drilling a socket 15 in and at a right angle to the face of margin 12 midway between two adjacent ducts 11, and then drilling through the bottom of this socket 15 two passageways 16 and 17 at an angle to the margin and leading into the two adjacent ducts near their ends. This is shown in detail in Fig. 4. For this purpose the diameter of the socket must be materially greater than the diameter of the passageways, so as to permit the proper entry of the drill at an angle to form the passageways, and is also materially greater than the diameter of the duct 11. Since however all of the ducts must not be connected at the same end or margin of the plate in order to secure circulation, but only alternate ducts or pairs, the sockets 15 and passageways 16 and 17 at the margin 12 are formed between the second and third ducts, the fourth and fifth, and so on alternately throughout the series. Similar sockets and passageways are formed through the surface of the opposite margin 14 midway between and connecting the closed ends 13 of the first and second and third and fourth ducts, and so on alternately throughout the series as particularly shown in Fig. 5. Where an uneven number of ducts 11 are formed, the one at one end of the series may be drilled entirely through the plate or may be drilled from the opposite margin of the plate from the others, so as to connect with the source of fluid supply on that side as at 18, Fig. 1, causing the fluid to travel through it in succession. This permits the fluid supply to have its entrance on one side of the plate and the discharge on the other side. The open ends of the ducts 11 are screw threaded and provided with screw plugs 19 as closures, and the engaging screw threaded surfaces may be tapered to make a tight fit. It will be understood, however, that the open ends of the first and last ducts 11 of the series are not closed but are screw threaded to receive and engage the ends of the supply and discharge pipes at 18 and 20, Fig. 1. The outer ends of the sockets 15 have tapered screw threaded connection with correspondingly screw threaded plug closures 21, but as illustrated in Fig. 4 the plugs do not extend to the bottom but when in place leave an open connection between passageways 16 and 17. It will be noted that by this arrangement of passageways in the plate, the heating or cooling fluid will pass in a tortuous passage through the plate evenly giving off or absorbing heat between the points of connection 18 and 20, and that there are no joints likely to become loose and leaky under the strains of contraction and expansion.

The arrangement of the connecting passageways between adjacent ducts illustrated in detail in Fig. 5 permits one inch ducts to be spaced 3¼ inches with satisfactory results, and the modified form shown in Fig. 6 permits a spacing two inches. In the form shown in Fig. 6 a socket 22 corresponding to socket 15 in Fig. 5 is drilled in the margin of the plate concentric with but of materially greater diameter than one duct 11 which constitutes a continuation of it, and a passageway 23 is then drilled at an angle from the bottom of that socket into the adjacent duct 11, and a single screw threaded plug 24 fitting the outer end of the socket constitutes a closure not only for the end of the passageway 23 but of the duct leading from the socket.

While the invention has been described with particular reference to forged steel plates, it will of course be understood that the invention is not limited to the use of this material, nor is the invention limited to the details of structure or procedure shown, or described, beyond what is called for in the claims.

Having thus described the invention, what is claimed as new and desired to be secured by Letters Patent is:

1. A hot plate for presses comprising a forged steel plate having a plurality of symmetrical parallel ducts drilled therein from one margin to a point near but terminating short of the opposite margin, passageways drilled at an angle to said ducts connecting adjacent ducts within the margin at alternate ends in series and screw plugs closing the open ends of said ducts and passageways except that at one end of each end duct of the series, the connecting passageways being drilled at an angle from the bottoms of outer cylindrical sockets of a diameter greater than that of the ducts and passageways and which are drilled at right angles to the margin.

2. A hot plate for presses comprising a forged steel plate having a plurality of symmetrical parallel ducts drilled therein from one margin to a point near but terminating short of the opposite margin, cylindrical sockets of larger diameter than said ducts drilled in said margins midway of and parallel to alternate pairs of adjacent ducts, connecting passageways drilled from the bottom of each socket at an angle to the ends of the adjacent ducts thus connecting them through the socket, and screw plugs closing the outer ends of said sockets and all of the outer ends of said ducts with the exception of the open end of each end duct in the series.

3. A hot plate for presses comprising a metallic plate having a plurality of symmetrical parallel ducts drilled therein from one margin to a point near but terminating short of the opposite margin, passageways drilled at an angle to said ducts connecting adjacent ducts within the margin at alternate ends in series and screw plugs closing the open ends of said ducts and passageways except that at one end of each end duct of the series, the connecting passageways being drilled at an angle from the bottoms of outer cylindrical sockets of a diameter greater than that of the ducts and passageways and which are drilled at right angles to the margin.

4. A hot plate for presses comprising a metallic plate having a plurality of symmetrical parallel ducts drilled therein from one margin to a point near but terminating short of the opposite margin, cylindrical sockets of larger diameter than said ducts drilled in said margins midway of and parallel to alternate pairs of adjacent ducts, connecting passageways drilled from the bottom of each socket at an angle to the ends of the adjacent ducts thus connecting them through the socket, and screw plugs closing the outer ends of said sockets and all of the outer ends of said ducts with the exception of the open end of each end duct in the series.

In testimony whereof I hereunto affix my signature.

WILLIAM H. APPLEBY.